United States Patent
Lyle et al.

(10) Patent No.: US 11,184,527 B2
(45) Date of Patent: *Nov. 23, 2021

(54) SMART SELFIE MIRROR

(71) Applicant: Pilot Inc., City of Industry, CA (US)

(72) Inventors: Aaron Lyle, Ontario, CA (US); John Paul Breganza, Vallejo, CA (US); Jessica Morales, Baldwin Park, CA (US); Katia Morales, Baldwin Park, CA (US); Hai Tran, Chino Hills, CA (US)

(73) Assignee: Pilot Inc., City of Industry, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/725,638

(22) Filed: Dec. 23, 2019

(65) Prior Publication Data

US 2020/0213507 A1 Jul. 2, 2020

Related U.S. Application Data

(63) Continuation of application No. 15/459,532, filed on Mar. 15, 2017, now Pat. No. 10,554,878.

(51) Int. Cl.
*H04N 5/232* (2006.01)
*G03B 15/03* (2021.01)
*H04N 7/18* (2006.01)
*H04N 5/225* (2006.01)
*G03B 17/56* (2021.01)
*G03B 17/38* (2021.01)
(Continued)

(52) U.S. Cl.
CPC ......... *H04N 5/23216* (2013.01); *G03B 15/03* (2013.01); *G03B 17/38* (2013.01); *G03B 17/561* (2013.01); *G03B 17/565* (2013.01); *H04N 5/2252* (2013.01); *H04N 5/23206* (2013.01); *H04N 7/183* (2013.01); *A45D 42/10* (2013.01); *H04M 1/72415* (2021.01); *H04M 2250/52* (2013.01); *H04N 5/2256* (2013.01); *H04N 5/2354* (2013.01); *H04W 4/80* (2018.02)

(58) Field of Classification Search
CPC ............ H04N 5/23216; H04N 5/2252; H04N 5/23206; H04N 7/183; H04N 5/2256; H04N 5/2354; G03B 17/565; G03B 17/38; G03B 15/561; G03B 15/03; H04M 1/72533; H04M 2250/52; A45D 42/10; H04W 4/80

See application file for complete search history.

(56) References Cited

U.S. PATENT DOCUMENTS

2005/0156758 A1* 7/2005 Gilliss .................... G08G 1/164
340/932.2
2016/0277660 A1* 9/2016 Kaiser ....................... F16B 2/12
(Continued)

*Primary Examiner* — Yogesh K Aggarwal
(74) *Attorney, Agent, or Firm* — Sheridan Ross P.C.

(57) ABSTRACT

A smart selfie mirror includes a mirror, a lighting source, a camera, and a user interface for operating the lighting source and the camera. The mirror can be used to position oneself in a desired position relative to the camera. The lighting source may be used to provide illumination for purposes of using the mirror and to provide additional light when using the camera. The camera can be used to take a picture or record a video of oneself. In some embodiments, the smart selfie mirror includes a wireless transceiver for receiving commands from and sending data to a connected mobile device or the Internet.

20 Claims, 3 Drawing Sheets

(51) Int. Cl.
  *H04N 5/235*     (2006.01)
  *H04W 4/80*      (2018.01)
  *A45D 42/10*     (2006.01)
  *H04M 1/72415*   (2021.01)

(56) References Cited

U.S. PATENT DOCUMENTS

2017/0010698 A1*  1/2017  Ibragimova ............ H04N 5/225
2017/0150032 A1*  5/2017  Chenn ................. H04N 5/23245
2017/0272112 A1*  9/2017  DiLaura ................. A45C 11/38
2018/0114493 A1*  4/2018  McLaughlin ........ H04N 5/2251

* cited by examiner

SMART SELFIE MIRROR

CROSS REFERENCE TO RELATED APPLICATIONS

The present application is a continuation of and claims the benefits of and priority to U.S. patent application Ser. No. 15/459,532, filed on Mar. 15, 2017, and entitled "SMART SELFIE MIRROR", which application is incorporated herein by reference in its entirety.

FIELD OF THE DISCLOSURE

The present disclosure relates to mirrors used to assist persons in taking a "selfie," and more particularly to a smart selfie mirror.

BACKGROUND

The rapid proliferation of mobile phones equipped with one or more cameras, together with the widespread use of social media, has given rise to the "selfie"—a photograph taken by oneself of oneself. Selfies are often taken with either the forward-facing or the backward-facing camera of a mobile phone. When the forward-facing camera is used, the screen of the mobile phone is visible to the user and serves as a viewfinder, allowing the user to adjust the position of the mobile phone to capture the desired photograph. When the backward-facing camera is used, the screen of the mobile phone is not visible to the user, such that the user can only point and shoot, using trial and error to obtain the desired photograph. Selfie sticks—extendible poles, to one end of which a mobile phone or other camera may be attached—have gained popularity as an accessory for taking selfies, as they allow the mobile phone (or other camera) to be held at greater than arm's length from the user, and thus allow the user to capture a wider field of view in the selfie.

SUMMARY

The present disclosure recognizes the difficulty in capturing a photograph of oneself by oneself, the awkwardness of attempting to take a picture of oneself with one arm fully extended to hold and operate a camera (whether in a mobile phone or not), and the poor quality of many selfies due to these and other shortcomings of available selfie equipment.

According to one embodiment of the present disclosure, a smart selfie mirror includes: a mirror; a camera; a lighting source; a processor; and a memory, the memory storing instructions for execution by the processor that, when executed, cause the processor to receive a command to activate the camera, and to activate the camera. Activating the camera may correspond to one of taking a photograph and recording a video. The lighting source may include at least one light-emitting diode. The smart selfie mirror may further include a user interface for controlling operation of the camera or the lighting source. The smart selfie mirror may further include a USB port. The smart selfie mirror may further include a wireless transceiver. The command to activate the camera may be received via the wireless transceiver. The memory may store additional instructions for execution by the processor that, when executed further cause the processor to establish, via the wireless transceiver, a wireless connection with the cloud; and upload at least one of a photograph and a video to the cloud. The memory may also store additional instructions for execution by the processor that, when executed, further cause the processor to receive, via the wireless transceiver, a command to adjust one of an intensity and a wavelength of light emitted by the lighting source. The memory may further store additional instructions for execution by the processor that, when executed, further cause the processor to transmit, via the wireless transceiver, data corresponding to one of a photograph and a video captured by the camera.

A smart mirror for taking selfies according to another embodiment of the present disclosure includes a base; a telescoping support; a mirror adjustably attached to the telescoping support; a camera positioned adjacent the mirror; an LED light source; and a user interface for operating the camera and the LED light source. The smart mirror of claim 11 may further comprise a wireless transceiver; a processor; and a memory, the memory storing instructions for execution by the processor that, when executed, cause the processor to establish a connection via the wireless transceiver. The memory may store additional instructions for execution by the processor that, when executed by the processor, cause the processor to receive, via the wireless transceiver, a command; and execute the command. The command may be one of a command to activate the camera or a command to adjust one of an intensity and a wavelength of light outputted by the LED light source. In some embodiments, the mirror can be panned, tilted, swiveled, and rotated relative to the base. The LED lighting source may at least partially surround the mirror. The memory may also store additional instructions for execution by the processor that, when executed by the processor, cause the processor to transmit, via the wireless transceiver, data corresponding to at least one image captured by the camera.

According to still another embodiment of the present disclosure, a system for taking selfies may include a smart selfie mirror including a base; a mirror connected to the base; a camera positioned adjacent the mirror; an LED light source; a first processor; a first wireless transceiver; and a user interface for operating the camera and the LED light source. The system may further include a mobile device including a second processor; a second wireless transceiver; and a memory storing instructions for execution by the second processor that, when executed, cause the second processor to establish a wireless connection with the smart selfie mirror via the first and second wireless transceivers; and transmit a command to the smart selfie mirror via the wireless connection. The command may relate to one of operation of the camera and operation of the LED light source. The command may additionally or alternatively cause the smart selfie mirror to transmit a live video stream via the first wireless transceiver.

The terms "memory," "computer-readable medium" and "computer-readable memory" are used interchangeably and, as used herein, refer to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable medium is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Figure 1:
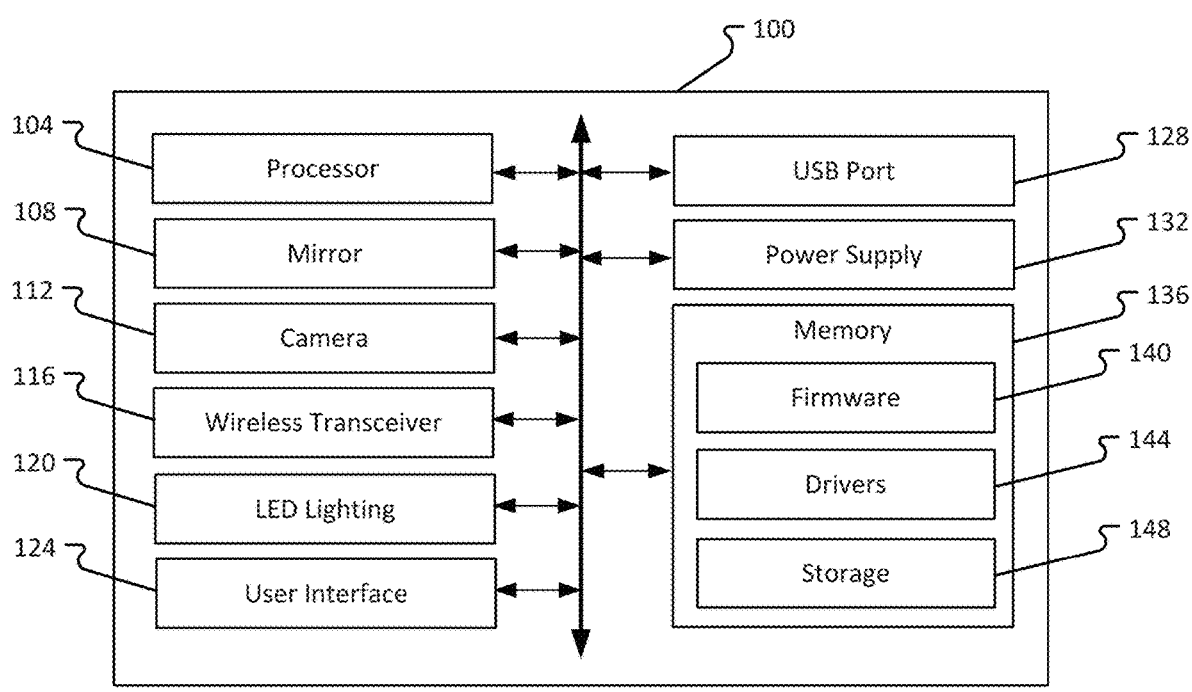
FIG. 1 is a block diagram of a smart selfie mirror according to one embodiment of the present disclosure.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

Referring first to FIG. 1, a smart selfie mirror 100 according to an embodiment of the present disclosure comprises a processor 104, a mirror 108, a camera 112, a wireless transceiver 116, LED lighting 120, a user interface 124, a USB port 128, a power supply 132, and a memory 136.

The processor 104 may correspond to one or multiple microprocessors that are contained within a housing of the smart selfie mirror 100. The processor 104 may comprise a Central Processing Unit (CPU) on a single Integrated Circuit (IC) or a few IC chips. The processor 104 may be a multipurpose, programmable device that accepts digital data as input, processes the digital data according to instructions stored in its internal memory, and provides results as output. The processor 104 may implement sequential digital logic as it has internal memory. As with most known microprocessors, the processor 104 may operate on numbers and symbols represented in the binary numeral system.

The mirror 108 allows a user of the smart selfie mirror 100 not only to see her or his reflection, but to position herself or himself (together with any other persons or objects) for a photograph or video taken or recorded by the camera 112. The mirror 108 may be substantially flat (e.g. a plane mirror), or the mirror 108 may have a radius of curvature (e.g. a concave or convex mirror). In some embodiments, the mirror 108 may comprise a substrate with a reflective coating on one side that serves as a reflecting surface. For example, a thin layer of silver or aluminum may be deposited on one side of a piece of plate glass or of another transparent material. One or more other materials may also be deposited on the substrate to aid in bonding, hardening, and/or durability. The mirror 108 may be a one-way mirror that reflects incoming light from one fully illuminated side thereof but does not reflect incoming light from an opposite, dimly illuminated side thereof. The mirror 108 may the same as or similar to a common vanity mirror, and may be used as a vanity mirror in addition to being used to assist in the taking of a selfie or other photograph and/or in the recording of video.

Figure 2:
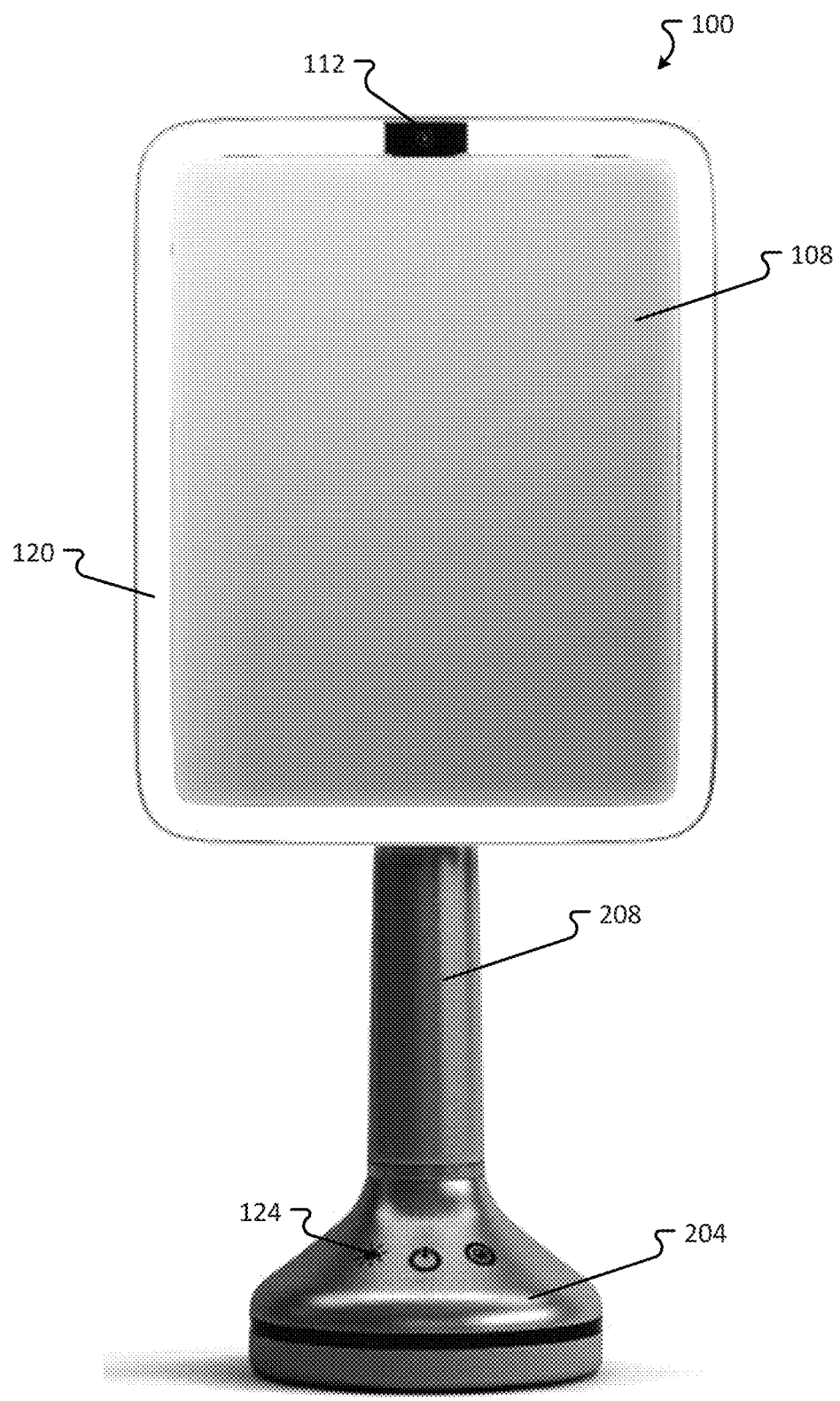
FIG. 2 is front view of a smart selfie mirror according to another embodiment of the present disclosure.

Although depicted in FIG. 2 as rectangular in shape, the present disclosure encompasses mirrors of other shapes, including mirrors that have straight edges, mirrors that have curved edges, and mirrors that have combinations of straight and curved edges. The mirror 108 may be, in some embodiments and by way of example, circular, elliptical, ovoidal, or square. Rectangular mirrors may beneficially be used to match the shape of images or videos captured by the camera 112, but aesthetic or other considerations may be better served by using mirrors of other shapes.

The camera 112 may be positioned along or adjacent a border of the mirror 108, or, where the mirror 108 is a one-way mirror, the camera 112 may be positioned behind the mirror 108. The camera 112 is a digital camera, and may use a CMOS image sensor or a CCD device to capture images and/or record video. The camera 112 may comprise various features known to those of skill in the art, including for example optical zoom, digital zoom, vignetting, and optical aberration correction. The camera 112 may be the same as or similar to a camera used in a mobile device. In some embodiments, the camera 112 may be capable of capturing only still photographs, while in other embodiments, the camera 112 may be capable of capturing both still and video images. Manufacturers of such cameras include, but are not limited to, Toshiba Corp., ST Microelectronics N.V., Sharp Corp., Omnivision Technologies, Inc., and ON Semiconductor.

Where the camera 112 is capable of capturing video images, the smart selfie mirror 112 may further comprise a microphone (not shown). The microphone may be used to capture audio signals while the camera 112 is recording video images, so that the resulting video includes sound.

The wireless transceiver 116 comprises hardware that allows the smart selfie mirror 100 to connect with a wireless router and/or with a mobile device, such as a smartphone, tablet, or laptop, or another computing device equipped for wireless communications. The wireless transceiver 116 may in some embodiments enable the smart selfie mirror 100 to upload captured photographs and/or videos to the cloud (e.g. via a wireless router) for storage and/or sharing, and further enables the smart selfie mirror 100 to post pictures to, or provide a live video stream via, one or more social media applications. The wireless transceiver 116 may further enable the smart selfie mirror 100 to receive commands from and to transmit data (including images and/or video recordings) to a connected device. The wireless transceiver 116 may comprise a Wi-Fi card, a Network Interface Card (NIC), a cellular interface (e.g., antenna, filters, and associated circuitry), an NFC interface, an RFID interface, a ZigBee interface, a FeliCa interface, a MiWi interface, a Bluetooth interface, a BLE interface, or the like. The wireless transceiver 116 may comprise, for example, a transmitter, a receiver, and an antenna, and may comprise software or firmware needed to operate such components.

The smart selfie mirror 100 further comprises at least LED lighting 120. "LED" refers to a light emitting diode. The LED lighting 120 may completely or partially surround the mirror 108. Additionally or alternatively, the LED lighting 120 may be provided on a base or stand that supports the mirror 108. In some embodiments, the LED lighting 120 may comprise a light bar or light strip that outputs a uniform light intensity along the length thereof, while in other embodiments, the LED lighting 120 may comprise one or more individual LEDs that serve as individual and distinguishable light sources.

The LED lighting 120 may have an adjustable intensity, and may be controllable (e.g. powered on, powered off, adjusted to greater or lesser intensity) via the user interface 124. The LED lighting 120 may be used to better illuminate, for example, the face of a user who is using the smart selfie mirror 100 as a vanity mirror (e.g. to apply makeup, to shave). Additionally, in some embodiments, the processor 104 may cause the LED lighting 120 to momentarily output light at the highest available intensity when an image is captured by the camera 112. In such embodiments, the LED lighting 120 serves as a flash for the camera 112. In other embodiments, the LED lighting 120 may serve as a flash for the camera 112 without involvement of the processor 104. The LED lighting 120 may comprise a light sensor for measuring or otherwise detecting ambient light, and may be configured to automatically adjust the intensity of the light output by the LED lighting 120 based on the information received from the light sensor.

In some embodiments, the LED lighting 120 may be configured to selectively output light at different wavelengths, so that the color of the light output by the LED lighting 120 may be adjusted. In such embodiments, the color of the light output by the LED lighting 120 may be adjustable by the user, while the processor 104 may additionally or alternatively be configured to automatically adjust the output color of the LED lighting 120, whether randomly or in some other fashion.

Although depicted and described as comprising LED lighting 120, the smart selfie mirror 100 may alternatively comprise a different kind of lighting that does not use LEDs. Other lighting types are well known and may be used with the smart selfie mirror 100.

The user interface 124 may comprise one or more buttons for controlling one or more features or components of the smart selfie mirror 100. In some embodiments, for example, the user interface 124 may comprise a power button that controls the flow of electricity from the power supply 132 to the processor 104, the camera 112, the wireless transceiver 116, and/or other components of the smart selfie mirror 100. The user interface 124 may further comprise one or more buttons and/or slider bars for controlling the LED lighting 120, including for turning the LED lighting 120 on and off, for adjusting the intensity of light output by the LED lighting 120, and for adjusting the wavelength (and therefore the color) of the light output by the LED lighting 120. Additionally, the user interface 123 may comprise one or more buttons for causing the camera 112 to take a picture or a video.

Although the foregoing description refers primarily to buttons, any input devices may be used to control the functions of the smart selfie mirror 100, including switches, slider bars, toggles, rocker switches, rotary switches, rheostats, and potentiometers. The user interface 124 may comprise a keyboard. Additionally, non-mechanical input devices may be used instead of or in addition to mechanical devices. For example, the user interface 124 may comprise one or more touchscreens, which may display a plurality of electronic switches or controls.

The user interface 124 may also include, in some embodiments, one or more output devices. The output devices, which may be screens or lights, for example, may be used to communicate to a user which of a plurality of options has been selected (e.g. whether the camera 112 is set to take a photograph or record a video) or to otherwise convey information about the settings of one or more components of the smart selfie mirror 100 (e.g. the current intensity setting of the LED lighting 120).

The user interface 124 may, in some embodiments, include only controls sufficient to allow a mobile device to connect to the smart selfie mirror 100 (which may be no controls at all, particularly if the mobile device connects to the smart selfie mirror 100 via a wired connection through, for example, the USB port 128). An app on the mobile device may then be used to control the various aspects of the smart selfie mirror 100.

The smart selfie mirror 100 may also comprise a USB port 128. The USB port 128 may have one or more functions, including as a power outlet for charging a mobile device connected thereto; to connect another device to the smart selfie mirror 100 for purposes of controlling one or more features of the smart selfie mirror 100; and to connect another device to the smart selfie mirror 100 for purposes of downloading images and/or videos taken using the camera 112 from the memory 136 to an external memory device (e.g. a memory device of a mobile phone or tablet). Although only one USB port 128 is shown, the smart selfie mirror 100 may comprise a plurality of USB ports 128. The USB ports 128 may be one or more of Type A, Type B, Mini-A, Mini-B, Micro-A, and/or Micro-B ports. Additionally or alternatively, the smart selfie mirror 100 may comprise one or more other types of ports, including an HDMI port, a DisplayPort, a DVI Video port, a VGA port, a Firewire port, and an Ethernet port. In some embodiments, such as embodiments of the smart selfie mirror 100 with a camera 112 capable of recording video, the smart selfie mirror 100 may further comprise an audio input jack, so that an external microphone, or other audio transducer or audio source, may be connected to the smart selfie mirror 100 and used to provide audio for a recorded video.

The power supply 132 may comprise circuitry for receiving power from an external source and accomplishing any signal transformation, conversion or conditioning needed to provide an appropriate power signal to the processor 104 and other components of the smart selfie mirror 100. Additionally or alternatively, the power supply 132 may comprise one or more batteries for supplying needed power to the smart selfie mirror 132. Such batteries may be used for normal operation, or such batteries may provide backup power (e.g. when power from an external source is not available). In embodiments comprising one or more batteries, the batteries may be removable and replaceable, and/or the batteries may be rechargeable. In some embodiments, the smart selfie mirror 100 may comprise a charging port for recharging rechargeable batteries contained therein.

The memory 136 may be used to store any electronic data needed for operation of the smart selfie mirror 100 and/or any electronic data recorded or received by the smart selfie mirror 100. For example, the memory 128 stores any firmware 140 needed for allowing the processor 104 to operate and/or communicate with the various components of the smart selfie mirror 100, as needed; drivers 144 for operating one or more of the components of the smart selfie mirror 100; and data storage 148 for storing pictures, videos, and other information captured by the camera 112 or received via the wireless transceiver 116, through the USB port 128, or via any other device or component. The memory 136 may correspond to any type of non-transitory computer-readable medium. In some embodiments, the memory 136 may comprise volatile or non-volatile memory and a controller for the same. Non-limiting examples of memory 136 that may be utilized in the smart selfie mirror 100 include RAM, ROM, buffer memory, flash memory, solid-state memory, or variants thereof.

Although FIG. 1 depicts the smart selfie mirror 100 as including memory 136, and in particular data storage 148, in addition or as an alternative to storing photographs and videos in a data storage 148 of the memory 136, the smart selfie mirror 100 may store photographs and videos in the cloud. Using cloud storage may beneficially reduce the necessary size and cost of the memory 136, while also allowing the photographs and videos stored in the cloud to be made available from anywhere and/or to anyone with an Internet connection.

In some embodiments, the smart selfie mirror 100 may be controllable via vocal commands. In such embodiments, the smart selfie mirror 100 may comprise a microphone or other audio transducers for receiving such commands. In addition, the memory 136 may store a speech recognition module comprising instructions that, when executed by the processor 104, allow the processor 104 to recognize one or more commands received via the microphone, which commands can then be carried out by the processor 104. In some embodiments, for example, a user may be able to utter a vocal command to "take a picture," which the processor 104 will receive via the microphone, process using the speech recognition module, and execute by causing the camera 112 to capture an image. In such embodiments, other features of the smart selfie mirror 100 may also be controllable by vocal command, including the LED lighting 120.

FIG. 2 depicts one embodiment of a smart selfie mirror 100. Visible in FIG. 2 are the mirror 108, the camera 112, and the LED lighting 120 of the smart selfie mirror 100, as well as the user interface 124. The use interface 124 is provided in a base 204 of the smart selfie mirror 100, which supports the mirror via a support 208. In some embodiments, the support 208 is a telescoping support, such that the smart selfie mirror 100 can be raised and lowered relative to the base 204. Additionally, the mirror 108 may be mounted to the support 208 with a rotatable mount, so that the mirror 108 can be rotated relative to the support 208. Such a configuration may beneficially allow a user of the smart selfie mirror 100 to capture photographs or record video in a portrait orientation, a landscape orientation, or in any orientation in between. Still further, the mirror 108 may be mounted to the support 208 with a mount that allows the mirror 108 to be panned, tilted, and/or swiveled relative to the support 208. In some embodiments, motorized mounts may be used to connect the mirror 108 to the support 208 that allow the mirror to be panned and/or tilted and/or rotated and/or swiveled without manual manipulation of the mirror 108.

Also in some embodiments, the base 204 may comprise a strong magnet for securing the smart selfie mirror 100 to a magnetic surface, regardless of whether the magnetic surface is oriented vertically, horizontally, or at some other angle. The base 204 may also comprise one or more attachment points for attaching the base to a surface using one or more mechanical fasteners, such as screws, bolts, or nails. As evident from FIG. 2, the smart selfie mirror 100 may be portable, such that the smart selfie mirror 100 can be moved from one location to another as desired by a user thereof. When the smart selfie mirror 100 is equipped with batteries, the smart selfie mirror 100 may be used even in locations where power is not otherwise available.

Figure 3:
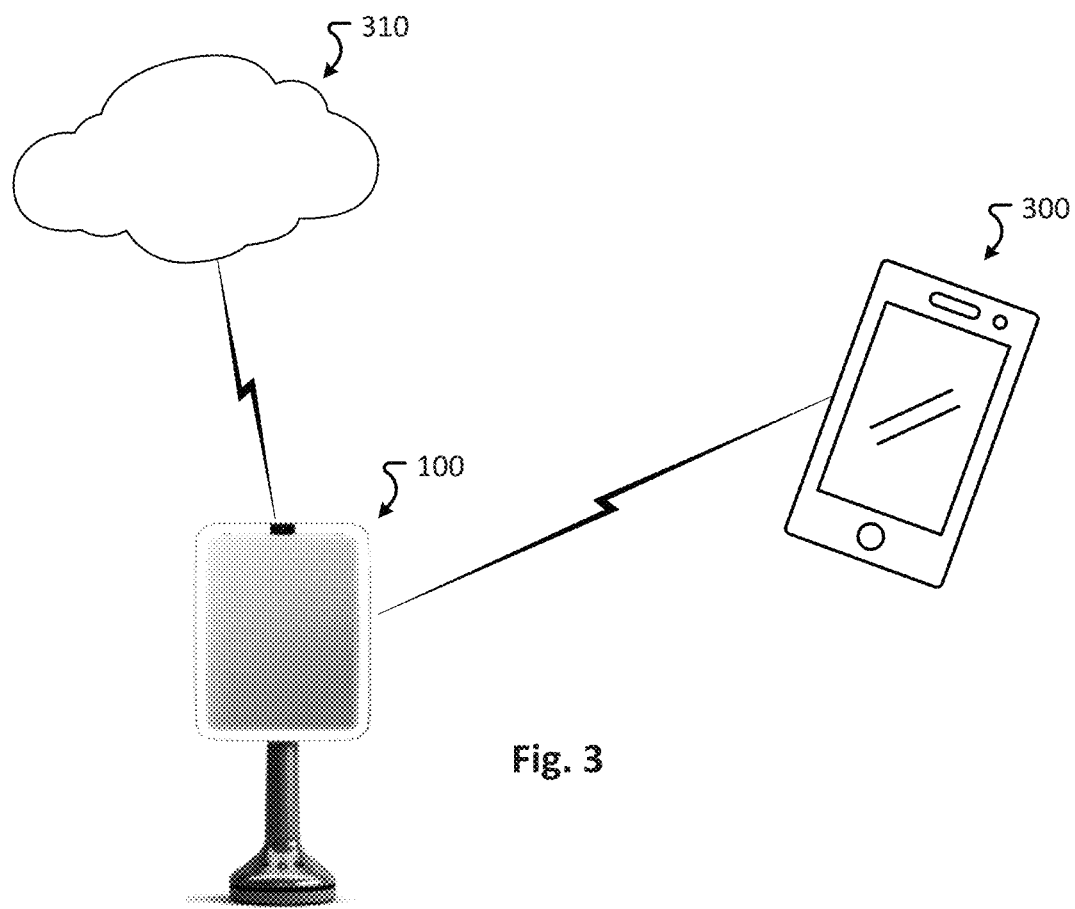
FIG. 3 is a diagram of a smart selfie mirror communicating with a mobile device according to a further embodiment of the present disclosure.
Figure 4:
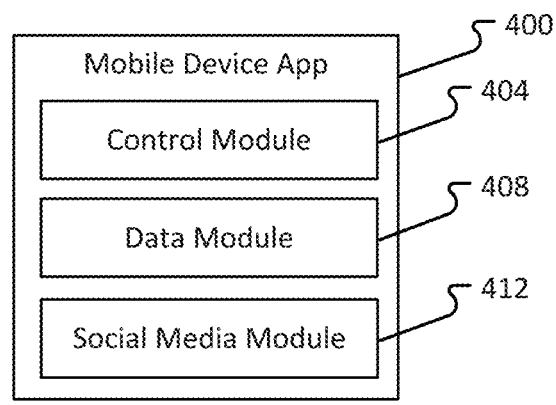
FIG. 4 is a block diagram of a mobile device app according to still another embodiment of the present disclosure.

Referring now to FIGS. 3-4, the smart selfie mirror 100 may establish a connection through the wireless transceiver 116 with a mobile device 300 comprising a wireless transceiver. The smart selfie mirror 100 may additionally or alternatively establish a connection through the wireless transceiver 116 with the cloud 310 (which connection may be by way of, for example, a wireless router). In other embodiments, the mobile device 300 may connect with the smart selfie mirror 100 via the USB port 128, e.g. using a USB cord. The mobile device 300 may be provided with an app 400 that allows the user to interface with the smart selfie mirror 100 over a direct wireless or wired connection using the mobile device 300. The app 400 may also enable the user to interface with the smart selfie mirror 100 over the Internet via the smart selfie mirror 100's connection with the cloud 310.

The app 400 may comprise, for example, a control module 404, a data module 408, and a social media module 412. The control module 404 may comprise instructions for execution by a processor of the mobile device 300 that enable the mobile device 300 to display to a user thereof a graphical user interface for controlling one or more features of the smart selfie mirror 100. For example, the control module 404 may enable the user to awaken the smart selfie mirror 100 from a low-power or sleep state, power on or off and otherwise control the LED lighting 120, adjust the pan and/or tilt and/or rotation of the mirror 108 (where the mirror 108 is mounted to the support 208 via one or more motorized mounts), select between taking photographs and recording video, activate the camera 112 to take a photograph or record a video, and/or adjust one or more features of the camera (e.g. zoom in or out).

The data module 408 may comprise instructions for execution by a processor of the mobile device 300 that enable the mobile device 300 to download or otherwise receive, from the smart selfie mirror 100, one or more pictures or videos (or corresponding data) taken or recorded by the camera 112. The data module 408 may be configured to automatically download any pictures or videos stored in the memory 136 of the smart selfie mirror 100 upon connection thereto, or the data module 408 may be configured to automatically receive any pictures or videos taken or recorded by the camera 112 as they are taken or recorded. The data module 408 may also enable the mobile device 300 to display a live stream from the camera 112 of the smart selfie mirror 112, which life stream may be recorded or not. The use of such a live stream from the camera 112 may allow the mobile device 300 to be used as a viewfinder for the camera 112, so that a user of the smart selfie mirror 100 can verify that he or she (or any other subject(s) to be photographed or videoed) are properly positioned and oriented relative to the camera 112. The data module 408 may further comprise instructions for causing the processor of the mobile device 300 to display on a screen of the mobile device 300 a graphical user interface through which a user of the mobile device 300 may access and control the functions of the data module 408.

The social media module 412 may comprise instructions for execution by a processor of the mobile device 300 that enable the mobile device 300 to post or otherwise provide to one or more social media applications one or more photographs or videos captured by the camera 112. The social media module 412 may also be configured to enable a live stream from the camera 112 to be provided as a live stream to a social media application, thus enabling one or more users of the social media application to view the live stream remotely. Operation of the social media module 412 as described herein depends upon the ability of the mobile device 300 to connect to the Internet, and the mobile device 300 may be equipped to access the Internet via a wireless transceiver similar to the wireless transceiver 116. For example, the mobile device 300 may comprise the hardware and software necessary to enable Internet access via Wi-Fi, GSM, LTE, 3G, 4G, Bluetooth, or any other network or cellular interface (e.g., antenna, filters, and associated circuitry) that enables or facilitates Internet access by the mobile device 300, whether directly or via a router or other access point. The social media module 412 may further comprise instructions for causing the processor of the mobile device 300 to display on a screen of the mobile device 300 a graphical user interface through which a user of the mobile device 300 may access and control the functions of the social media module 412.

Embodiments of the smart selfie mirrors described herein may be provided, for example, in hotels. Such smart selfie mirrors, which may be permanently installed in a hotel bedroom or bathroom to avoid theft thereof, may allow hotel guests to take selfies or other images or videos, and to post the selfies or other images or videos to their social media accounts. Smart selfie mirrors may also be useful at tourist attractions or in other locations where selfies are commonly taken.

A number of variations and modifications of the foregoing disclosure can be used. It would be possible to provide for some features of the disclosure without providing others.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description, for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, and ARM® Cortex-A and ARM926EJ-S™ processors. A processor as disclosed herein may perform computational functions using any known or future-developed standard, instruction set, libraries, and/or architecture.

What is claimed is:

1. A smart selfie mirror comprising:
a housing connected to a telescoping support via a motorized mount, the motorized mount configured to pan and tilt the housing;
a mirror supported by the housing, the mirror having an outer perimeter;
a camera integrated into the housing, the camera positioned outside of and adjacent to the outer perimeter;
a lighting source;
a user interface integrated into the housing, the user interface configured to control operation of at least one of the camera or the lighting source;
a processor; and
a memory, the memory storing instructions for execution by the processor that, when executed, cause the processor to:
receive a command to activate the camera; and
activate the camera.

2. The smart selfie mirror of claim 1, wherein activating the camera comprises one of taking a photograph or recording a video.

3. The smart selfie mirror of claim 1, wherein the lighting source comprises at least one light-emitting diode.

4. The smart selfie mirror of claim 1, wherein the user interface is at least one of a touch screen, a plurality of buttons, or a plurality of sliders.

5. The smart selfie mirror of claim 1, further comprising a USB port.

6. The smart selfie mirror of claim 1, further comprising a wireless transceiver.

7. The smart selfie mirror of claim 6, wherein the command to activate the camera is received via at least one of the user interface or the wireless transceiver.

8. The smart selfie mirror of claim 6, wherein the memory stores additional instructions for execution by the processor that, when executed, further cause the processor to:
establish, via the wireless transceiver, a wireless connection with a cloud; and
upload at least one of a photograph or a video to the cloud.

9. The smart selfie mirror of claim 6, wherein the memory stores additional instructions for execution by the processor that, when executed, further cause the processor to:
receive, via the wireless transceiver, a command to adjust one of an intensity or a wavelength of light emitted by the lighting source.

10. The smart selfie mirror of claim 6, wherein the memory stores additional instructions for execution by the processor that, when executed, further cause the processor to:
transmit, via the wireless transceiver, data corresponding to one of a photograph or a video captured by the camera.

11. A smart mirror for taking selfies, the smart mirror comprising:
a housing having a base;
a telescoping support extending from the base;
a mirror secured to the telescoping support via a motorized mount configured to pan and tilt the mirror relative to the base;
a camera positioned adjacent the mirror and integrated with the housing;
an LED light source; and
a user interface integrated with the housing, the user interface configured for operating the camera and the LED light source.

12. The smart mirror of claim 11, further comprising:
a wireless transceiver;
a processor; and
a memory, the memory storing instructions for execution by the processor that, when executed, cause the processor to:
establish a connection via the wireless transceiver.

13. The smart mirror of claim 12, wherein the memory stores additional instructions for execution by the processor that, when executed by the processor, cause the processor to:
receive, via the wireless transceiver, a command; and
execute the command.

14. The smart mirror of claim 13, wherein the command is one of a command to activate the camera or a command to adjust one of an intensity or a wavelength of light outputted by the LED light source.

15. The smart mirror of claim 11, wherein the mirror can be swiveled, and rotated relative to the base.

16. The smart mirror of claim 11, wherein the LED light source at least partially surrounds the mirror.

17. The smart mirror of claim 12, wherein the memory stores additional instructions for execution by the processor that, when executed by the processor, cause the processor to:
transmit, via the wireless transceiver, data corresponding to at least one image captured by the camera.

18. A system for taking selfies, the system comprising:
a smart selfie mirror comprising:
a housing having a base, the housing connected to a telescoping support via a motorized mount, the motorized mount configured to pan and tilt the housing;
a mirror connected to the base;
a camera positioned adjacent the mirror and integrated with the housing;
an LED light source;

a first processor;

a first wireless transceiver; and a user interface integrated with the housing, the user interface configured for operating the camera and the LED light source; and a mobile device comprising:

a second processor;

a second wireless transceiver; and a memory storing instructions for execution by the second processor that, when executed, cause the second processor to:

establish a wireless connection with the smart selfie mirror via the first and second wireless transceivers; and transmit a command to the smart selfie mirror via the wireless connection.

19. The system of claim 18, wherein the command relates to one of operation of the camera or operation of the LED light source.

20. The system of claim 18, wherein the command causes the smart selfie mirror to transmit a live video stream via the first wireless transceiver.

* * * * *